United States Patent [19]

Ohtsuka

[11] Patent Number: 5,809,315
[45] Date of Patent: *Sep. 15, 1998

[54] ELECTRONIC APPARATUS

[75] Inventor: Masanori Ohtsuka, Kanagawa-ken, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 533,642

[22] Filed: Sep. 25, 1995

[30] Foreign Application Priority Data

Sep. 29, 1994 [JP] Japan .................................. 6-235464

[51] Int. Cl.⁶ .............................. G06F 1/26; G03B 7/26
[52] U.S. Cl. ............................... 395/750.05; 395/750.06; 395/182.2; 395/182.22; 364/492; 364/483; 364/707; 396/302; 396/303; 396/721; 396/206; 396/129; 396/231
[58] Field of Search ..................... 364/492, 707, 364/483; 396/129, 97, 205–206, 221, 231, 277–279, 301–303; 324/431, 441; 323/272, 318; 307/31; 318/696; 395/750.05, 750.06, 182.2, 182.22

[56] References Cited

U.S. PATENT DOCUMENTS

| | | | |
|---|---|---|---|
| 4,964,073 | 10/1990 | Watanabe | 364/707 |
| 5,021,728 | 6/1991 | Sato | 323/272 |
| 5,032,864 | 7/1991 | Ishimura | 396/301 |
| 5,034,674 | 7/1991 | Sato | 318/696 |
| 5,053,804 | 10/1991 | Odaka et al. | 396/301 |
| 5,089,768 | 2/1992 | Sato | 323/318 |
| 5,124,738 | 6/1992 | Yamashita | 396/231 |
| 5,162,836 | 11/1992 | Ishimaru | 396/231 |
| 5,210,568 | 5/1993 | Miyake et al. | 396/303 |
| 5,235,378 | 8/1993 | Tominaga et al. | 396/205 |
| 5,323,171 | 6/1994 | Yokouchi et al. | 396/303 |
| 5,387,820 | 2/1995 | Imagawa | 307/31 |
| 5,412,448 | 5/1995 | Kunishige | 396/231 |

Primary Examiner—Emanuel Todd Voeltz
Assistant Examiner—Tuan Q. Dam
Attorney, Agent, or Firm—Robin, Blecker & Daley

[57] ABSTRACT

The present invention relates to an electronic apparatus which is arranged to drive a load by means of a microcomputer to which the boosted voltage obtained by boosting a battery output by boosting means is applied. The present invention also relates to a method of making the boosting means inoperative upon completion of a load-driving operation by the computer after the battery output is restored to a predetermined level, and switching the voltage to be applied to the microcomputer in the electronic apparatus from the boosted output to the battery output, thereby preventing the microcomputer from malfunctioning due to a lowering in the battery output.

24 Claims, 11 Drawing Sheets

FIG.2
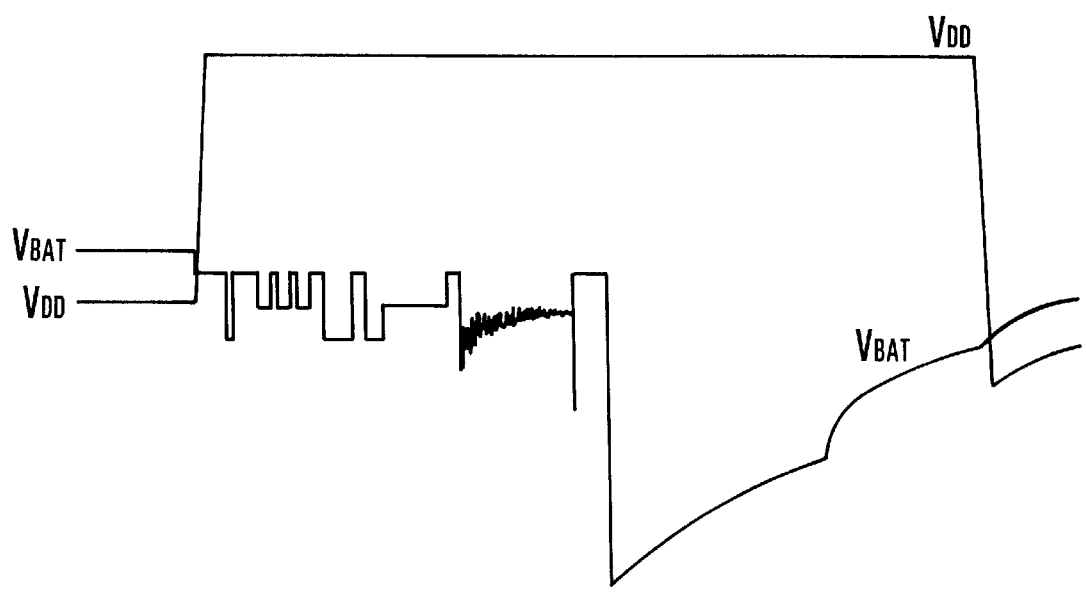
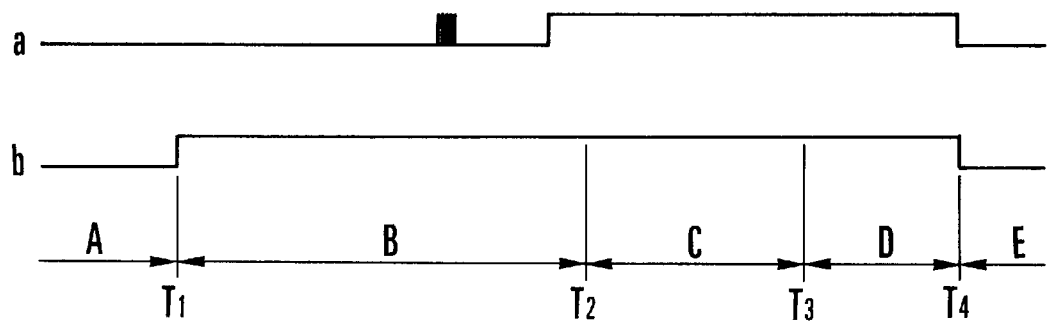

ELECTRONIC APPARATUS

BACKGROUND OF THE INVENTION

1. Field of the Invention

The present invention relates to a device for and method of controlling the power source of an electronic apparatus whose power source voltage varies depending on the state of use.

2. Description of the Related Art

The recent development of electronic apparatuses is remarkable and, in particular, portably designed electronic apparatuses are becoming smaller and smaller in size and weight. Batteries for driving such electronic apparatuses are also becoming increasingly smaller in size and weight, as by reducing their battery voltages compared to conventional batteries or sacrificing their internal resistances to some extent.

In general, the electronic apparatuses using such batteries include a power source system provided with boosting means such as a DC/DC converter. When such an electronic apparatus is in operation, a voltage higher than the source voltage is generated by the boosting means for the purpose of high-speed operation or precision guarantee, whereas when the electronic apparatus is inoperative or in low-speed operation, the boosting means is made inoperative so that the power loss of the battery can be suppressed as much as possible.

These electronic apparatuses have become very convenient in that there is no need to execute the processing of backing up a power source for a predetermined times by setting control means to a low-current-consumption mode (such as a hold mode of a microcomputer) during a large-current-load operation, as described in Japanese Laid-Open Patent Application No. Sho 64-17032.

When the above-described conventional example is in operation, no problem occurs since a high voltage is generated and supplied by the boosting means. However, if the boosting means is changed from an operative state to an inoperative state or is made inoperative at the same time that the control means changes to a low-speed operation state, the power source voltage lowers and hinders the operation of the control means (a microcomputer) (the power source voltage falls below the minimum operating voltage of the microcomputer and causes a malfunction) or causes system reset (for example, the microcomputer is restored to its initial state).

This tendency occurs particularly frequently when the battery is substantially consumed, or when a battery having a large internal resistance is used, or when the boosting means is made inoperative before the power source voltage is restored immediately after the application of a large-current-load electrical power.

SUMMARY OF THE INVENTION

It is, therefore, an object of the present invention to provide a power-source controlling method and a device for carrying out this method, both of which do not cause system reset or hinder the operation of control means when boosting means is changed from an operative state to an inoperative state.

Another object of the present invention is to provide a power-source controlling method and a device for carrying out this method, both of which are capable of changing boosting means from an operative state to an inoperative state according to various operating states such as a high-speed operating state, an operating state which requires high precision, a low-speed operating state and a state which suppresses power loss as much as possible, and which are capable of preventing problems such as system reset from occurring when the boosting means is changed from the operative state to the inoperative state.

Another object of the present invention is to provide a power-source controlling method and a device for carrying out this method, both of which are capable of executing the processing of providing a visual display, inhibiting the succeeding operation or requesting an operator to replace a consumed battery with a new one, if there is a possibility that the operation of control means may be hindered or system reset may be caused when boosting means is changed from an operative state to an inoperative state, and which are capable of continuing the previous operation without substantial interruption if battery replacement is performed.

Another object of the present invention is to provide a power-source controlling method and a device for carrying out this method, both of which are capable of preventing occurrence of problems, such as system reset, and coping with various statuses while taking account of tolerable differences between individual electronic apparatuses or various environments.

Another object of the present invention is to provide a power-source controlling method and a device for carrying out this method, both of which are capable of indicating the state of a power source, particularly, the extent of consumption of the power source (the remaining amount of battery power) or the extent of fatigue of the power source.

To achieve the above-described objects, in accordance with one aspect of the present invention, there is provided a device arranged to inhibit boosting means for supplying electrical power to a control circuit from changing to an inoperative state if the output voltage of power source means is not higher than a predetermined level.

In accordance with another aspect of the present invention, there is provided a device arranged to cause boosting means to change to an inoperative state upon completion of a control operation by a control circuit if the output voltage of power source means is not less than a predetermined level or after the output voltage is restored to a predetermined value or more.

In accordance with another aspect of the present invention, there is provided a device in which the aforesaid predetermined value for use in changing the boosting means to the inoperative state is set according to the minimum operating voltage of a computer, the operation mode of the computer or ambient environmental conditions.

In accordance with another aspect of the present invention, there is provided a device arranged to make boosting means inoperative after the output voltage of power source means is fully restored, by making the boosting means inoperative when a predetermined time passes after the completion of a control operation by a control circuit.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 2 is a timing chart aiding in explaining the operation of the present invention;

DETAILED DESCRIPTION OF THE PREFERRED EMBODIMENTS

Preferred embodiments of the present invention will be described below in detail with reference to the accompanying drawings.

Figure 1:
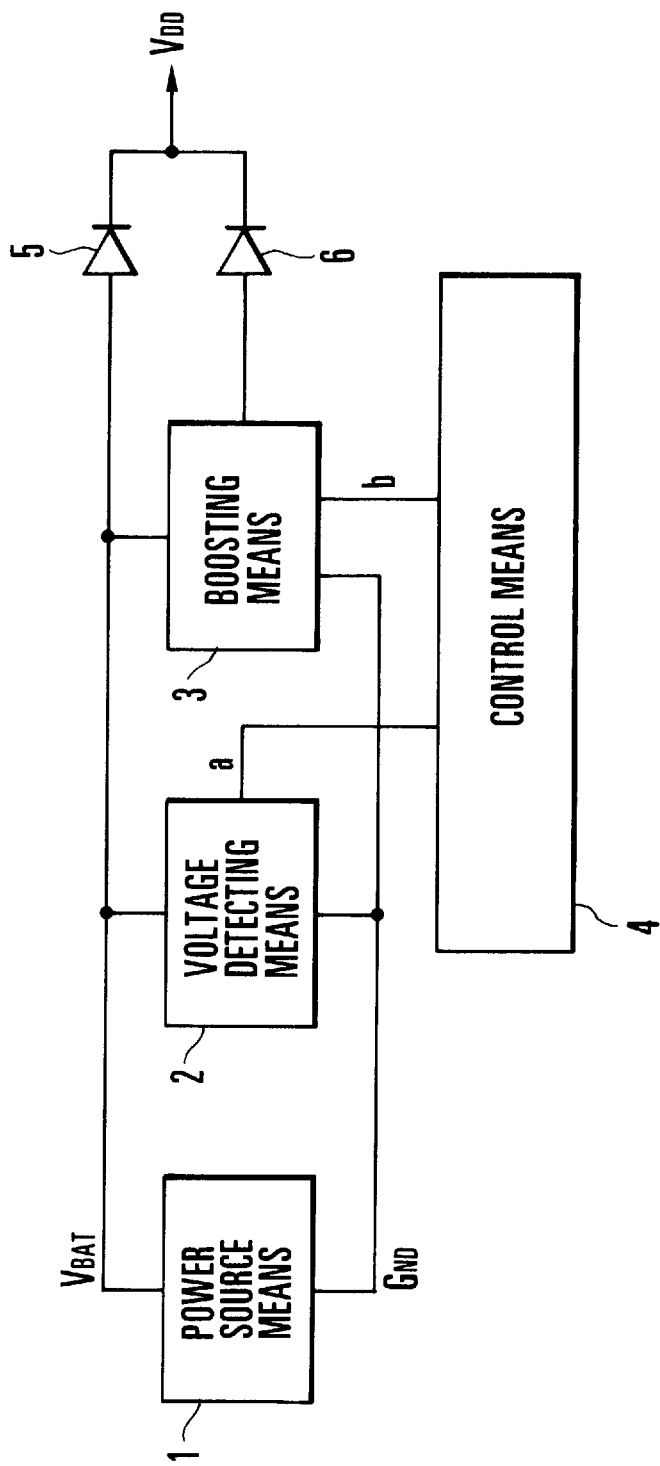
FIG. 1 is a block diagram showing a first embodiment of the present invention.

FIG. 1 is a block diagram showing a circuit according to a first embodiment of the present invention. The circuit shown in FIG. 1 includes power source means 1 such as a battery or another available power supply, voltage detecting means 2, such as a comparing circuit or an A/D converter, which is connected across the power source means 1 and serves to detect the voltage across the power source means 1, boosting means 3, such as a charge pump, which is connected across the power source means 1 and is formed by a DC/DC converter for generating an output voltage higher than its input voltage, control means 4 which includes a microcomputer for setting a comparative voltage for the voltage detecting means 2, receiving an output from the voltage detecting means 2, or controlling the boosting operation of the boosting means 3, and reverse-current preventing diodes 5 and 6 which are connected to the outputs of the power source means 1 and the boosting means 3, respectively. When the boosting means 3 is inoperative, a voltage to be outputted from the diode 5 or 6 becomes a voltage approximately equal to the output (hereinafter called $V_{BAT}$) of the power source means 1, whereas when the boosting means 3 is operative, the voltage to be outputted from the diode 5 or 6 becomes a voltage (hereinafter called $V_{DD}$) approximately equal to a voltage higher than $V_{BAT}$.

Figure 3:
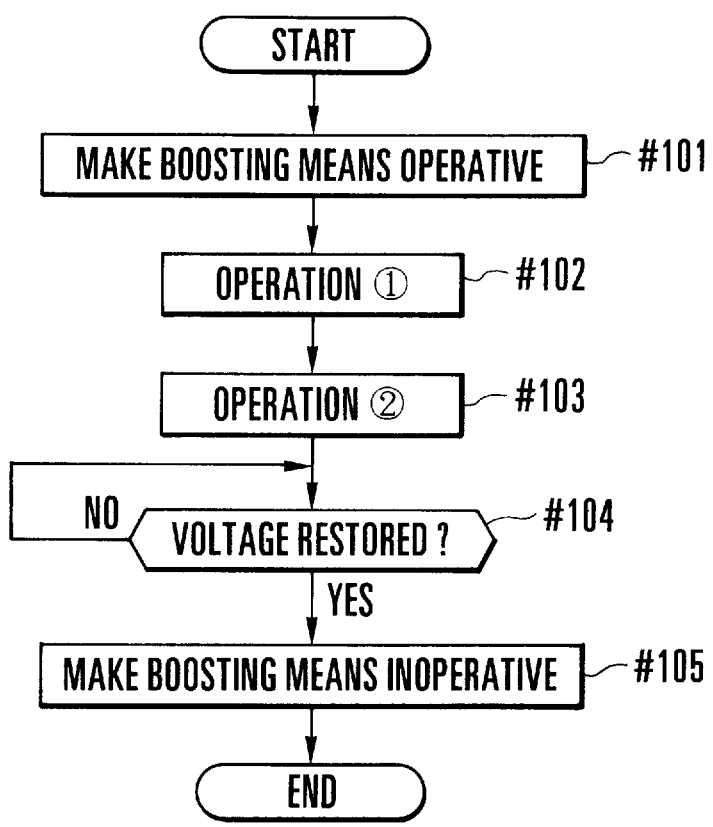
FIG. 3 is a flowchart aiding in explaining the operation of the present invention.

The operation of the shown circuit constructed in the above-described manner will be described below with reference to the timing chart of FIG. 2 and the flowchart of FIG. 3.

Referring first to FIG. 2, a state A corresponds to the inoperative state of the boosting means 3. During the state A, the voltage relationship between $V_{BAT}$ and $V_{DD}$ is $V_{BAT} \geq V_{DD}$.

At time $T_1$, the boosting means 3 starts its operation (#101). Then, $V_{BAT}$ slightly lowers according to the boosting operation, whereas $V_{DD}$ is abruptly boosted by the operation of the boosting means 3. When $V_{DD}$ rises up to a predetermined voltage, it becomes stable at that voltage. The voltage relationship between $V_{BAT}$ and $V_{DD}$ at that time is $V_{DD} \geq V_{BAT}$. In this case, $V_{DD}$ is the output from the boosting means 3.

When the boosting operation is completed, an operation ① which is a comparatively light load (#102) and an operation ② which is a heavy load (#103) are sequentially carried out by means (not shown). These steps respectively correspond to the states B and C shown in the timing chart of FIG. 2. In the steps, the level of the voltage $V_{BAT}$ varies according to the respective load currents. The operations ① and ② may not be carried out in that sequence, or only one of the operations ① and ② may be carried out.

When the aforesaid sequence is completed, the voltage detecting means 2 starts to detect the level of the power source voltage $V_{BAT}$ (#104) at time $T_3$. This step corresponds to the state D shown in the timing chart of FIG. 2. When $V_{BAT}$ is restored to a predetermined voltage (a voltage higher than both a system reset voltage and a preset minimum voltage which can guarantee the operation of the microcomputer), the process exits from the loop of the Step #104 at time $T_4$ and makes the boosting means 3 inoperative, thereby coming into the state B (#105). The above-described process is controlled by the control means 4.

As is apparent from the above description, according to the construction and method of the present invention, the boosting means 3 is made inoperative after the $V_{BAT}$ is restored to the predetermined voltage, whereby it is possible to prevent occurrence of problems, such as the operation ① or ② or other operations (not shown) being hindered by a lowering in the power source voltage and operation failure and system reset being caused by a lowering in $V_{BAT}$ due to the inoperative state of the boosting means 3.

Figure 4:
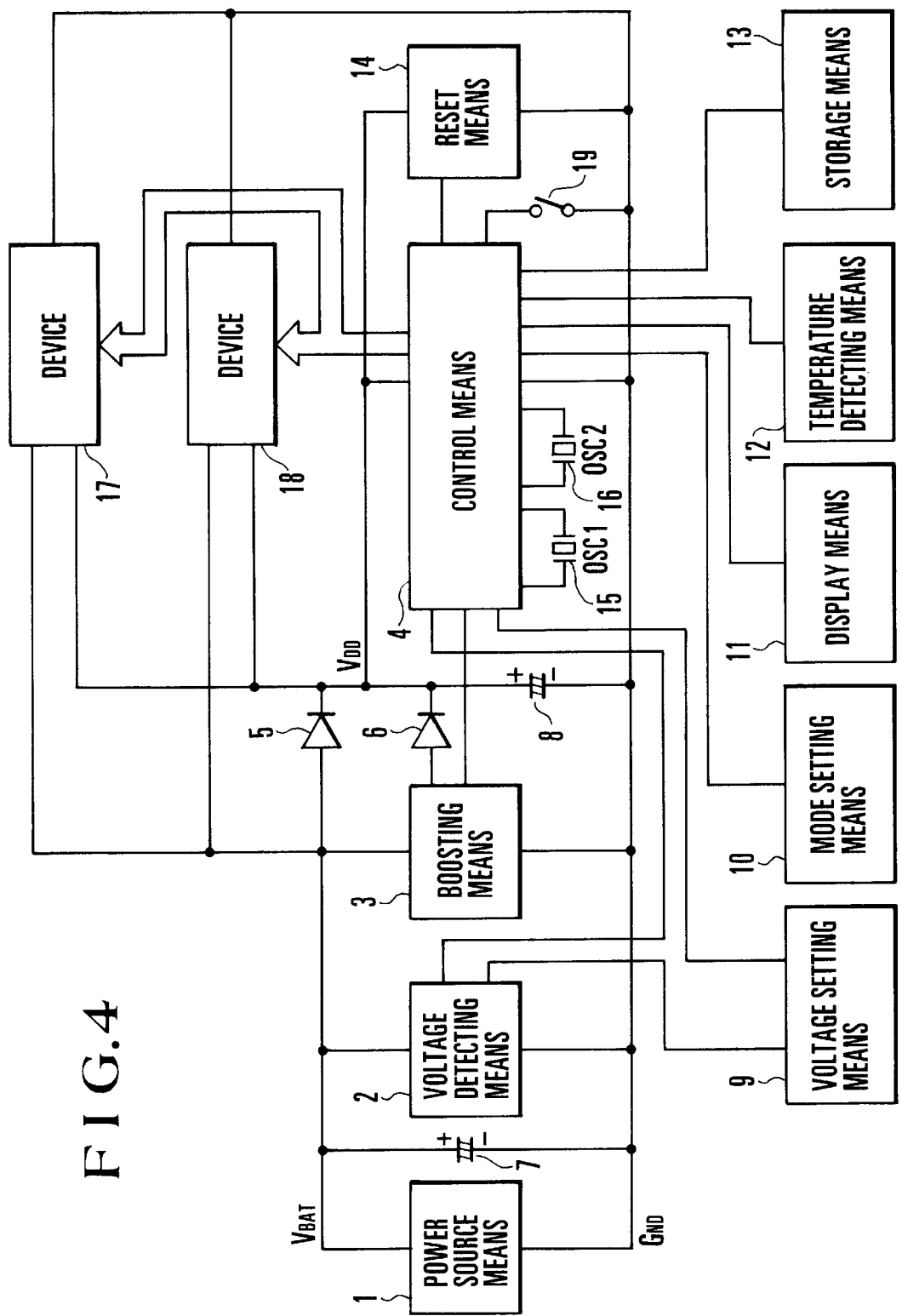
FIG. 4 is a block diagram showing a second embodiment of the present invention.

FIG. 4 is a block diagram showing a second embodiment of the present invention. In FIG. 4, the same reference numerals are used to denote constituent elements similar to those shown in FIG. 1.

The shown circuit includes the power source means 1 such as a battery or another available power supply, the voltage detecting means 2 which is connected across the power source means 1 and serves to detect the voltage across the power source means 1, the boosting means 3 which is connected across the power source means 1 and serves to boost its input voltage and generate an output voltage higher than the input voltage, the control means 4 which includes a microcomputer for setting a comparative voltage for the voltage detecting means 2, receiving an output from the voltage detecting means 2, controlling the boosting operation of the boosting means 3, or controlling a display operation or various other operations, and the reverse-current preventing diodes 5 and 6 which are connected to the outputs of the power source means 1 and the boosting means 3, respectively. When the boosting means 3 is inoperative, the voltage to be outputted from the diode 5 or 6 becomes a voltage approximately equal to the output $V_{BAT}$ of the power source means 1, whereas when the boosting means 3 is operative, the voltage to be outputted from the diode 5 or 6 becomes the voltage $V_{DD}$ outputted from the boosting means 3 which is approximately equal to a voltage higher than $V_{BAT}$.

The shown circuit also includes a $V_{BAT}$ smoothing capacitor 7, a $V_{DD}$ smoothing capacitor 8, voltage setting means 9 for setting the comparative voltage for the voltage detecting means 2, which is formed by a variable resistor, a switch, memory means or the like and which directly operates the voltage detecting means 2 or inputs an instruction to the control means 4 to cause it to operate the voltage detecting means 2, and mode setting means 10 for setting various operation modes. The mode setting means 10 is arranged to set various operation modes, such as a high-speed operation mode and a low power consumption mode in which to operate the microcomputer of the control means 4. On the basis of such a mode, the control means 4 causes devices 17 or 18 of the electronic apparatus to execute an operation unique to the electronic apparatus.

The shown circuit also includes display means 11 for providing visual display of the mode setting of the mode setting means 10, the setting of the voltage setting means 9 and power-source information such as a warning of abnormality, temperature detecting means 12 for detecting an ambient temperature, storage means 13 such as a memory which is electrically erasable and writable and can retain its stored data in the absence of power, reset means 14 for detecting the voltage $V_{DD}$ and causing or cancelling system reset, high-speed-operation oscillating means 15 (hereinafter called OSC1), low-speed-operation oscillating means 16 (hereinafter called OSC2), the device 17 for performing a power consumption operation which is a comparatively small load, the device 18 for performing a power consumption operation which is a large load, and a switch 19 for activating the shown circuit.

Figure 5:
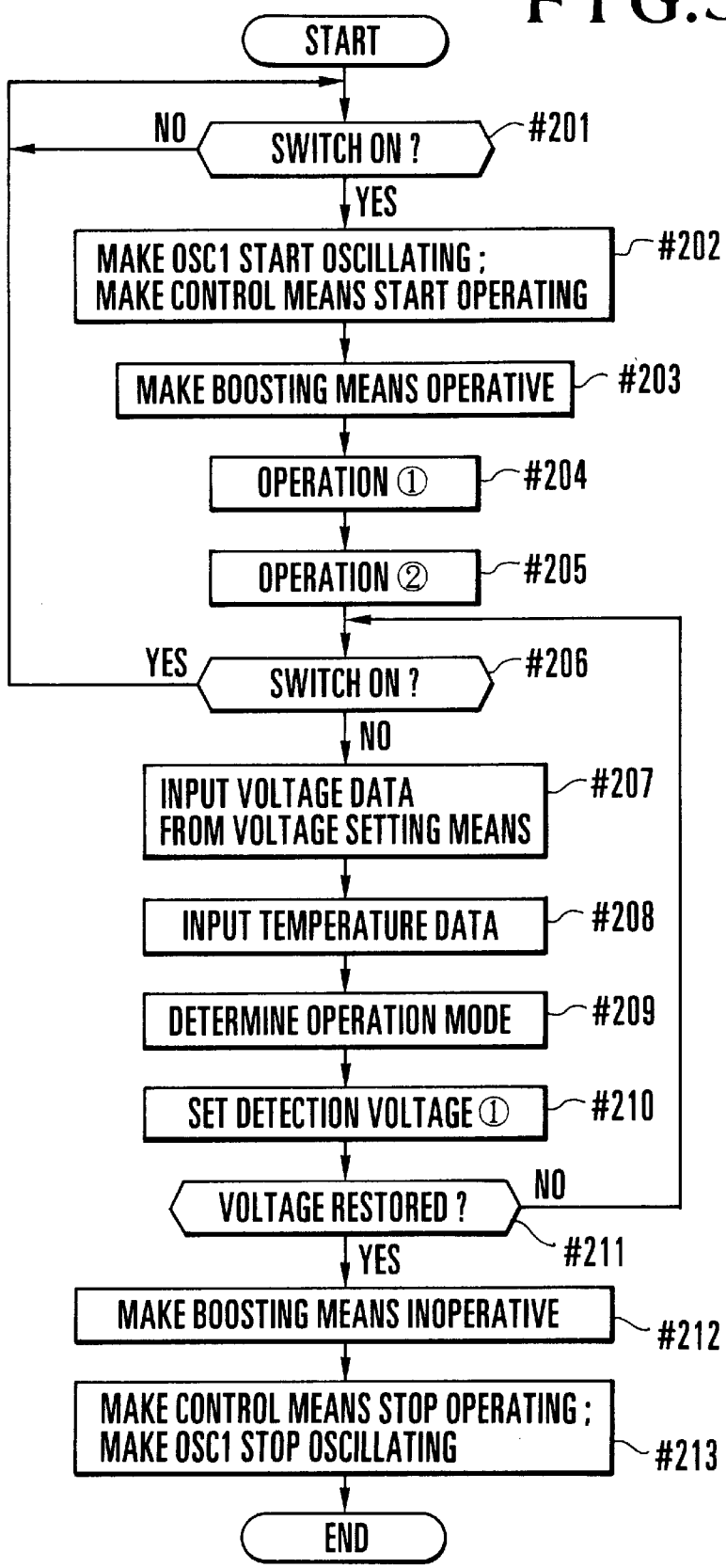
FIG. 5 is a flowchart aiding in explaining the operation of the embodiment of FIG. 4.

The operation of the second embodiment constructed in the above-described manner will be described below with reference to the flowchart of FIG. 5.

When the switch 19 is turned on (#201), the OSC1 which is the high-speed-operation oscillating means 15 starts its oscillation and the control means 4 leaves its held state (the state in which its operation is stopped) and starts the operation (#202). Then, the boosting means 3 starts its operation in response to a control signal from the control means 4, and the output of the boosting means 3 increases so that the voltage $V_{DD}$ becomes a stable voltage higher than $V_{BAT}$, thereby enabling the high-speed operation or precision guarantee of the electronic apparatus (#203). Then, the operation ①(#204) and the operation ②(#205) which are unique to the electronic apparatus are executed. These steps #204 and #205 are respectively executed by the devices 17 and 18 in accordance with a control signal from the control means 4.

When the aforesaid sequence of the steps #204 and #205 is completed, the process returns to Step #201 if the switch 19 is again turned on, or the process proceeds to Step #206 if the switch 19 is not turned on. Then, the control means 4 receives data indicative of the voltage supplied from the power source means 1 from the voltage setting means 9 (#207), receives temperature data from the temperature detecting means 12 (#208), and receives the mode setting of a desired operation mode from the mode setting means 10 and determines the operation mode (#209). On the basis of the information obtained in Steps #207 to #209, the control means 4 sets a comparative voltage (hereinafter called detection voltage ① for the voltage detecting means 2 (#210). Then, the control means 4 determines through the voltage detecting means 2 whether the voltage $V_{BAT}$ has been restored (#211), and if the voltage is lower than the detection voltage ①, the process returns to Step #206. If the voltage is higher than the detection voltage ①, the process proceeds to Step #212. In Step #212, the boosting means 3 is made inoperative, then the operation of the control means 4 is stopped, and then the oscillation of the high-speed-operation oscillating means OSC1 is stopped (#213). The operation of the second embodiment is completed in this manner.

It is to be noted that the higher the temperature indicated by the temperature data, the detection voltage ① is set lower and that if the operation mode is the low power consumption mode, the detection voltage ① is set lower than in the high-speed operation mode (the microcomputer is driven at a high clock frequency). This is because it is necessary to set the detection voltage ① taking account of the minimum operating voltage of the microcomputer since the minimum operating voltage varies depending on the temperature or the operation mode.

According to the above-described construction and method of the second embodiment, it is possible to set a desired detection voltage which matches the operation mode or corresponds to a tolerable difference between individual products which are available as the reset means or variations in an environment such as temperature. Accordingly, it is possible to prevent occurrence of problems such as operation failure and system reset caused by a lowering in $V_{BAT}$ due to the inoperative state of the boosting means.

In the above-described flowchart, the boosting means 3 may be made operative by hardware before the control means 4 is made operative by software in response to the input from the switch 19, i.e., Steps #202 and #203 may be executed in the inverse order. In this case as well, it is possible to achieve effects similar to those of the second embodiment.

In addition, it is possible to achieve effects similar to those of the second embodiment, even by executing either one of the aforesaid normal operation performed by the device 17 (Step #204) and the aforesaid large-load operation performed by the device 18 (Step #205), or even by inverting the order of Steps #204 and #205.

In addition, it is possible to achieve effects similar to those of the second embodiment, even by changing the order of Steps #207 to #209, or even by fixing some conditions and omitting part of the steps.

In addition, it is possible to achieve effects similar to those of the second embodiment, even by setting the detection voltage ① in Step #210 not by software means using the control means 4 but by direct manipulation using hardware means.

Figure 6:
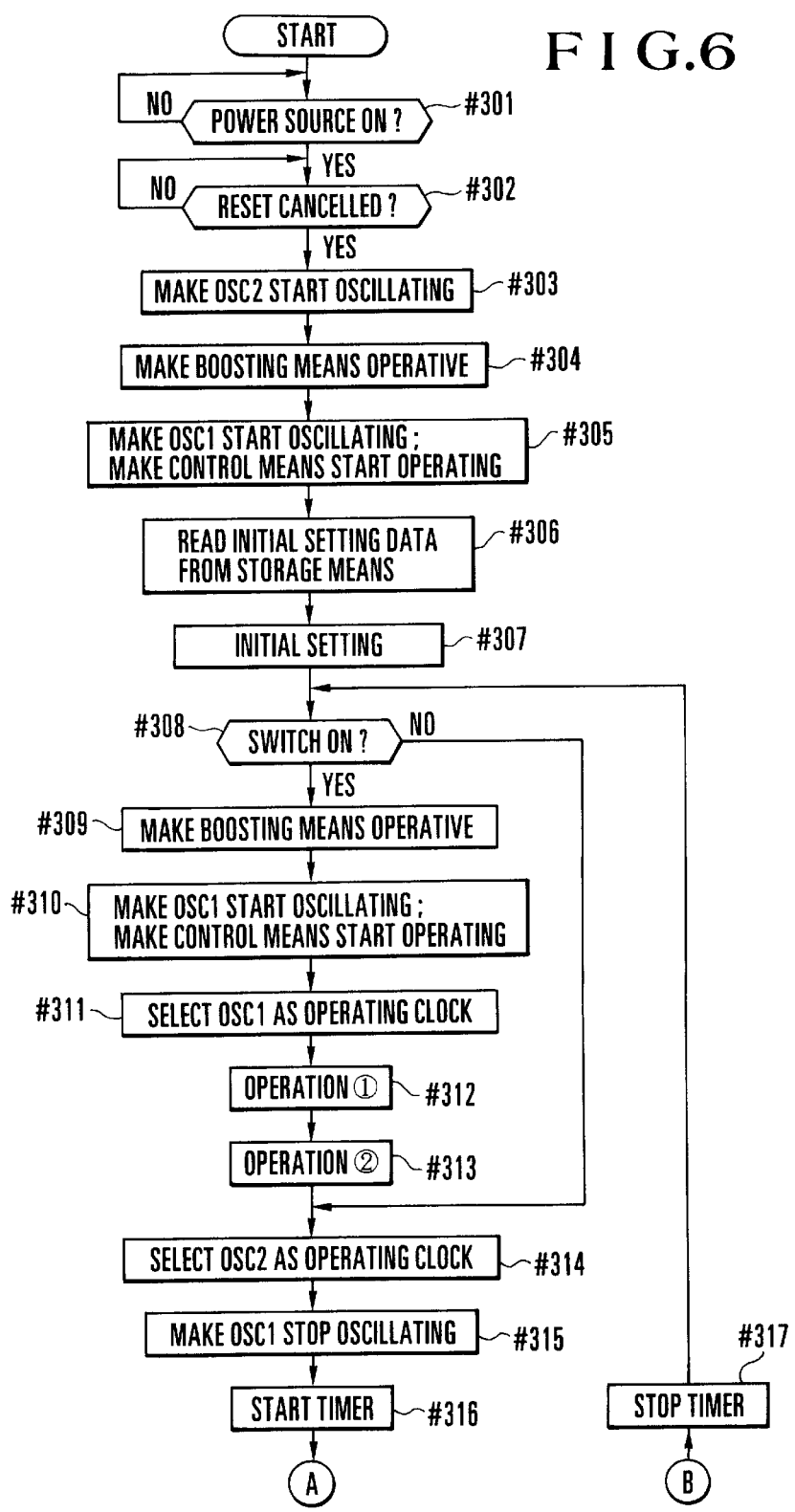
FIG. 6 shows one part of a flowchart aiding in explaining the operation of a third embodiment of the present invention.
Figure 7:
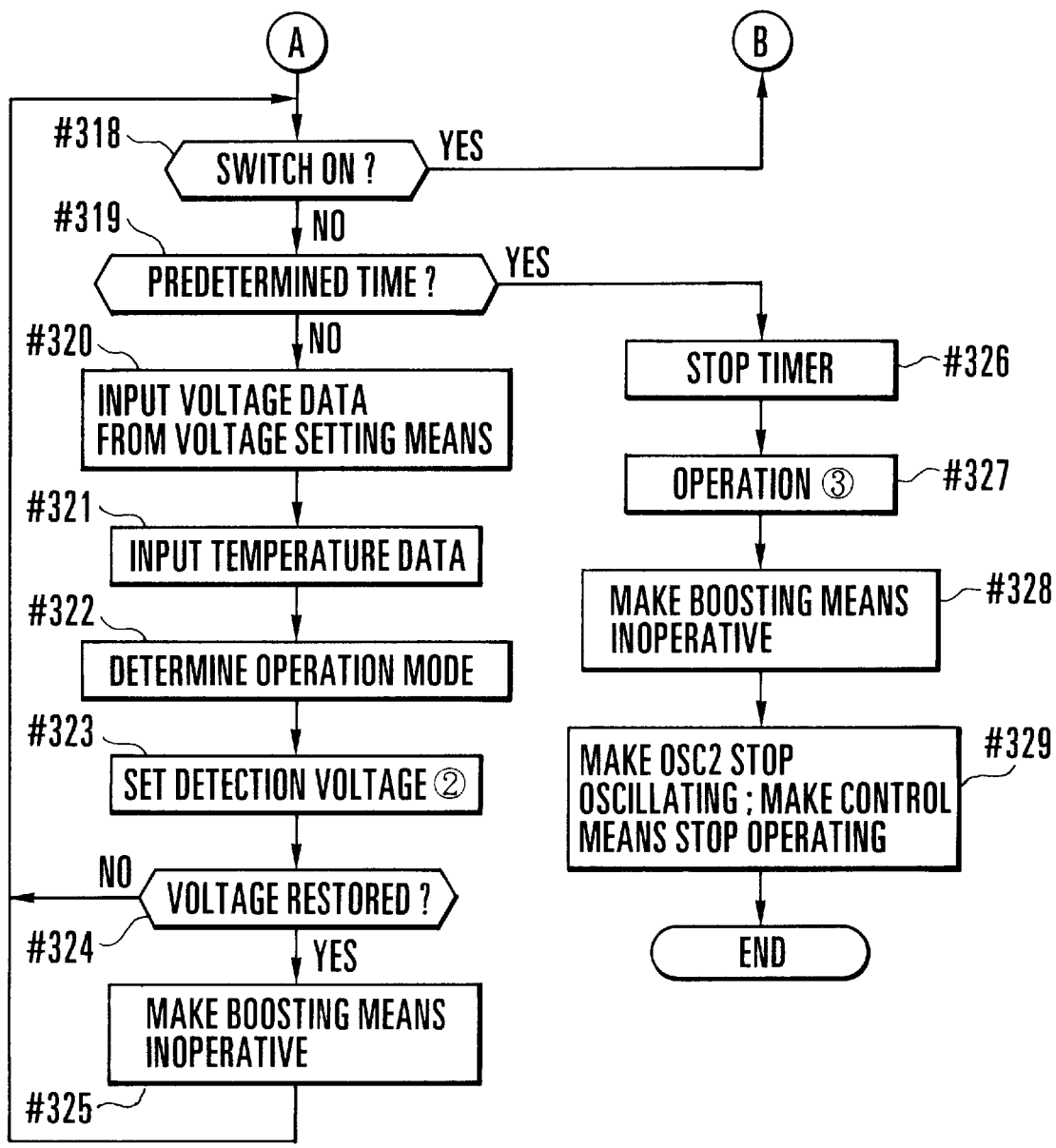
FIG. 7 shows the other part of the flowchart aiding in explaining the operation of the third embodiment of the present invention.

FIGS. 6 and 7 show the flowchart of the operation of a third embodiment of the present invention. The system construction shown in FIG. 4 is used in the third embodiment.

When a battery is inserted to supply a source voltage or when a power source switch (not shown) is turned on (the power source switch is connected to the power source means 1, and when the output signal of the power source switch is inputted to the control means 4, the control means 4 detects the on operation of the power source switch) (#301), the voltage $V_{BAT}$ starts to gradually rise according to the power supply capability and the impedance of the power source system as well as the characteristics of the $V_{BAT}$ smoothing capacitor 7. When the voltage $V_{BAT}$ reaches a reset cancel voltage determined by the reset means 14 (#302), system reset is cancelled. Then, the OSC2 which is the low-speed-operation oscillating means 16 starts its oscillation (#303), and the boosting means 3 is made operative to generate a voltage so that the voltage $V_{DD}$ becomes higher than the voltage $V_{BAT}$ (#304). Then, the OSC1 which is the high-speed-operation oscillating means 15 starts its oscillation to start the operation of the control means 4 (#305). The control means 4 reads initial setting data from the storage means 13 (#306) and performs an initial setting operation, such as the operation of again setting the operation mode and the operation of again setting the previous operational state, on the basis of the initial setting data (#307).

Then, if the activating switch 19 is turned on (#308), the boosting means 3 is made operative (#309) and the OSC1 which is the high-speed-operation oscillating means 15 is made to start oscillating and the operation of the control means 4 is started (#310). The operating clock is switched from OSC2 to OSC1 (#311) to perform setting so that a high-speed operation can be performed, and the operations ① and ② are respectively executed by the devices 17 and 18 (#312 and #313). The operation ① is a normal operation which involves comparatively small power consumption, while the operation ② is a large-load operation which involves large power consumption. When the operations ① and ② are completed, the operating clock is switched from OSC1 to OSC2 (#314) so that the following process can be performed as a low-speed operation. The oscillation of the OSC1 is stopped (#315), and an internal timer of the control means 4 or an external timer (not shown) is started (#316) to start a time counting operation. These timers serve as a timer for realizing a so-called automatic power-off function for maintaining the operation of the electronic apparatus for a predetermined time and returning the electronic apparatus to its initial state after the passage of the predetermined time. After the timer is started, it is determined whether the activating switch 19 has been turned on again (#318). If the activating switch 19 has not been turned on, it is determined through the time counting operation whether the predetermined time has passed (#319). The control means 4 receives voltage data indicative of the voltage supplied from the power source means 1 (#320), receives temperature data from the temperature detecting means 12 (#321), determines the operation mode set through the mode setting means 10 and the like (#322), and sets the detection voltage ② (#323). These setting operations are performed similarly to Steps #207 to #210 of FIG. 5. Then, the control means 4 determines through the voltage detecting means 2 whether the voltage $V_{BAT}$ has been restored (the voltage is higher than the detection voltage ② (#324). If the voltage $V_{BAT}$ has not yet restored (the voltage is lower than the detection voltage ②, the process returns to Step #318. If the voltage $V_{BAT}$ has been restored (the voltage is higher than the detection voltage ②) (#324), the boosting means 3 is made inoperative (#325). After the voltage $V_{DD}$ is made approximately equal to the $V_{BAT}$, the process returns to Step #318. When the time counting operation proceeds and the predetermined time passes (#319), the timer is stopped (#326), and since a switch manipulation or the like does not occur for a predetermined time after the completion of the aforesaid sequence, an operation ③ for returning the electronic apparatus to the initial operational state is executed (#327). The boosting means 3 is made inoperative (#328), the oscillation of the OSC2 is stopped and the operation of the control means 4 is stopped (#329). Thus, the process is brought to an end.

If it is determined in Step #308 that the activating switch 19 has not been turned on, the process jumps to Step #314 without executing the aforesaid sequence such as the operations ① and ②, and Step #314 and the following steps are executed.

If it is determined in Step #318 that the activating switch 19 has been turned on, the timer is stopped and cleared (#317) and Step #308 and the following steps are executed.

According to the above-described construction and method of the third embodiment, even if battery replacement is performed or the power source switch is again turned on, the electronic apparatus executes an initial setting operation on the basis of preset stored information or information stored before the battery replacement is performed or the power source switch is again turned on. Accordingly, since an operator does not need to newly input the required settings after the battery replacement is performed or the power source switch is again turned on, the operator can smoothly use the electronic apparatus without substantial interruption.

In addition, the setting of the detection voltage ② enables the electronic apparatus to operate smoothly without causing a problem such as system reset even after the boosting means 3 is made inoperative. Since the detection voltages ① and ② shown in FIGS. 5 and 7 are set slightly higher than the minimum operating voltage of the microcomputer as described above, it is possible to match the voltages ① and ② with each individual operation without unduly extending the time required for the voltage to be restored and without increasing energy consumption.

Figure 8:
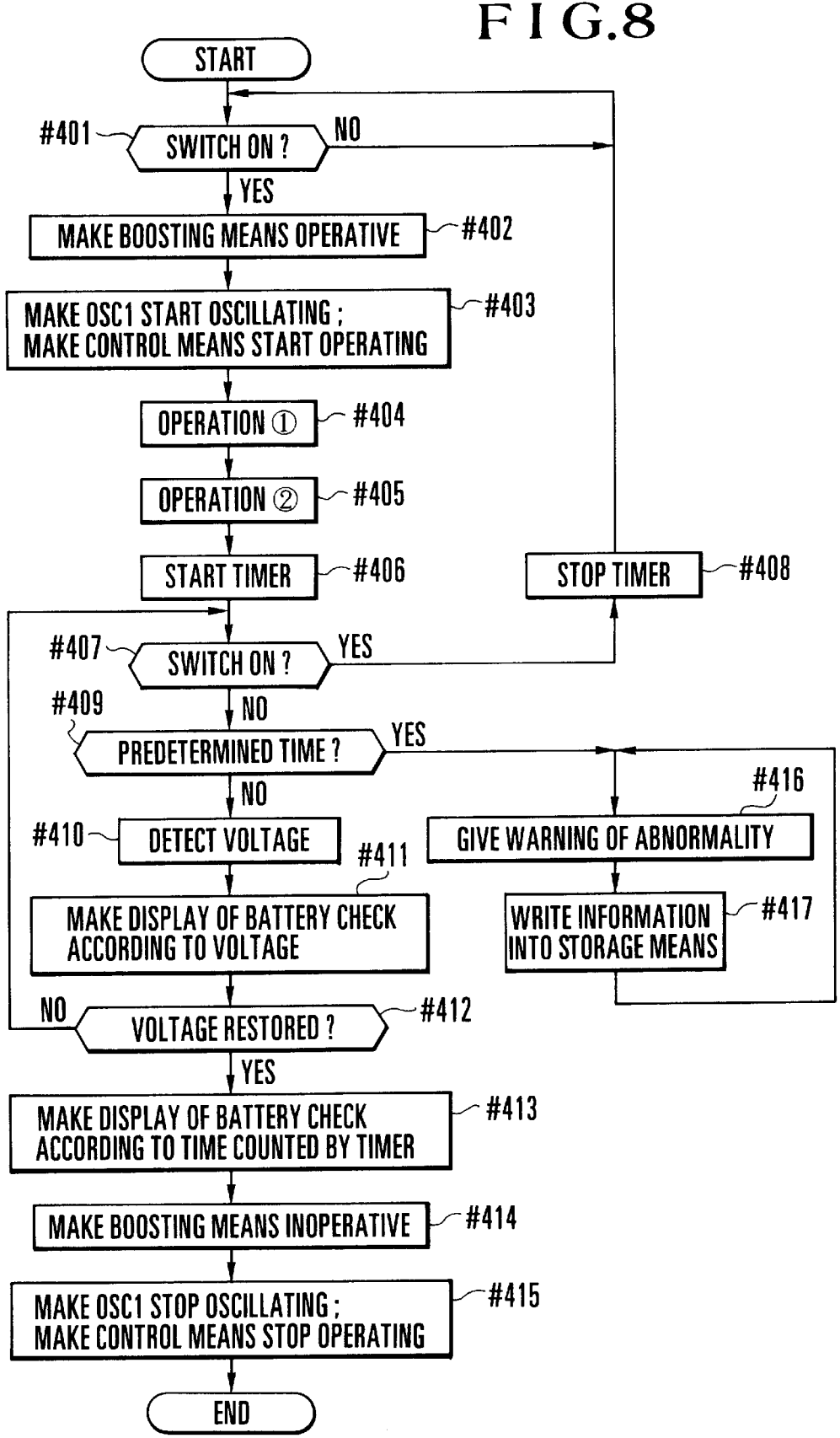
FIG. 8 is a flowchart aiding in explaining the operation of a fourth embodiment of the present invention.

FIG. 8 is a flowchart showing the operation of a fourth embodiment of the present invention.

When the switch 19 is turned on (#401), the boosting means 3 is made operative (#402) and the oscillation of the OSC1 is started and the operation of the control means 4 is started (#403). Then, the operations ① and ② are respectively performed by the devices 17 and 18 (#404 and #405). When the sequence of Steps #404 and #405 is completed, a timer is started (#406). This timer is different from the timer for automatic power-off referred to above in connection with FIGS. 6 and 7, and serves to determine the maximum time required for the power source to be restored.

When this timer is started, it is determined whether the activating switch 19 has been turned on again (#407), and it is determined whether a predetermined time has passed (#409). If both answers are "NO", the voltage detecting means 2 is made to detect the voltage across the power source means 1. The number of voltage values to be detected may be one or more, and the method of converting the analog quantity of a voltage value into a digital quantity may also be used. The display means 11 is made to provide a battery-check display corresponding to the detected voltage value (#411). Then, it is determined whether the voltage $V_{BAT}$ has been restored (the voltage $V_{BAT}$ has been restored to a predetermined voltage) (#412). If the voltage $V_{BAT}$ has not yet been restored, Step #407 and the following steps are repeated and the visual batter-check display is repeatedly updated in accordance with the detected voltage.

When the voltage $V_{BAT}$ is restored (#412), the display means 11 is made to provide a battery-check display indicative of the extent of consumption or fatigue of the battery which corresponds to the time which has passed after the timer is started in Step #406 (#413). If the battery is consumed, a longer time is taken from the start of the timer until it is determined that the voltage $V_{BAT}$ has been restored. The extent of consumption of the battery is, therefore, determined from the time counted by the timer. The boosting means 3 is made inoperative (#414), and the oscillation of the OSC1 is stopped and the operation of the control means 4 is stopped (#415).

If the voltage $V_{BAT}$ is not restored within a predetermined time (#409), the control means 4 determines that the battery is consumed to a substantially nonusable extent or that an abnormality has occurred in the battery, and gives a warning of abnormality (#416). The control means 4 stores information obtainable at that time, such as date and operation mode, into the storage means 13 (#417). Such information is used for initial setting in Steps #301 to #307 of the flowchart of FIG. 6 when battery replacement is performed or the power source is again turned on. When Step #417 is completed, the process returns to Step #416 and this loop is repeated. During this time, since the boosting means 3 is kept operative, only this loop is continued without executing another operation, until the battery or the power source is consumed to a completely nonusable extent.

According to the above-described construction and method, it is possible to detect the present voltage status of the battery or the extent of consumption or fatigue of the battery.

If the power source means 1 is not restored to the predetermined voltage, it is possible to give the operator a warning to that effect or request the operator to replace the battery with a new one, by giving a warning of abnormality to the operator who is using the electronic apparatus or by inhibiting the subsequent operation and intentionally making the boosting means 3 operative.

In addition, if the power source means 1 is not restored to the predetermined voltage, there is no need to newly perform an initial setting operation when battery replacement is performed or the power source is again turned on, because the information obtained at that time, such as date and operation mode, is stored in the storage means 13. Accordingly, the operator can continuously use the electronic apparatus without substantial interruption even when battery replacement is performed or the power source is again turned on.

Figure 9:
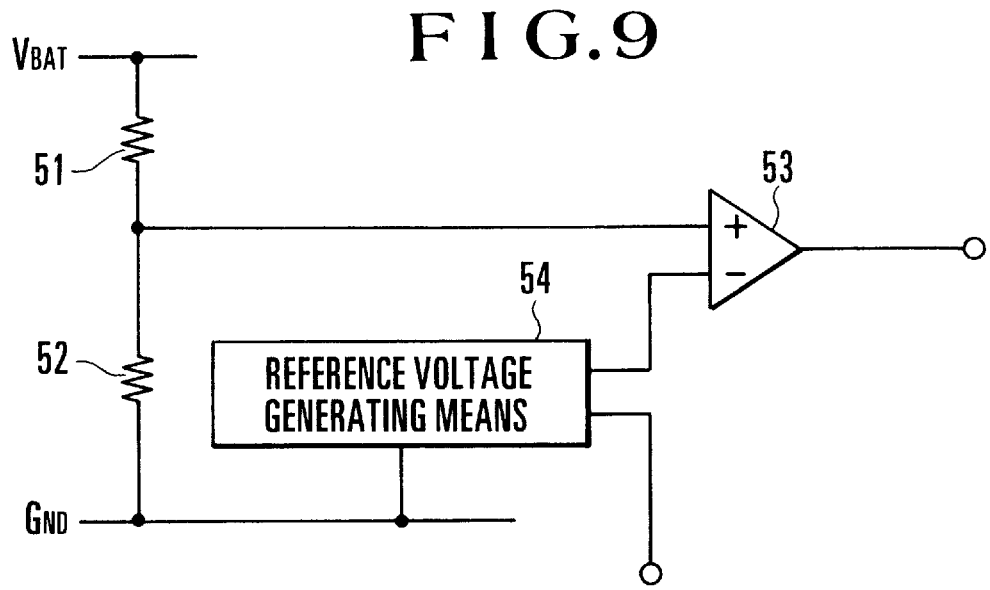
FIG. 9 is a circuit diagram showing the construction of the voltage detecting means used in the embodiment of FIG. 4.
Figure 10:
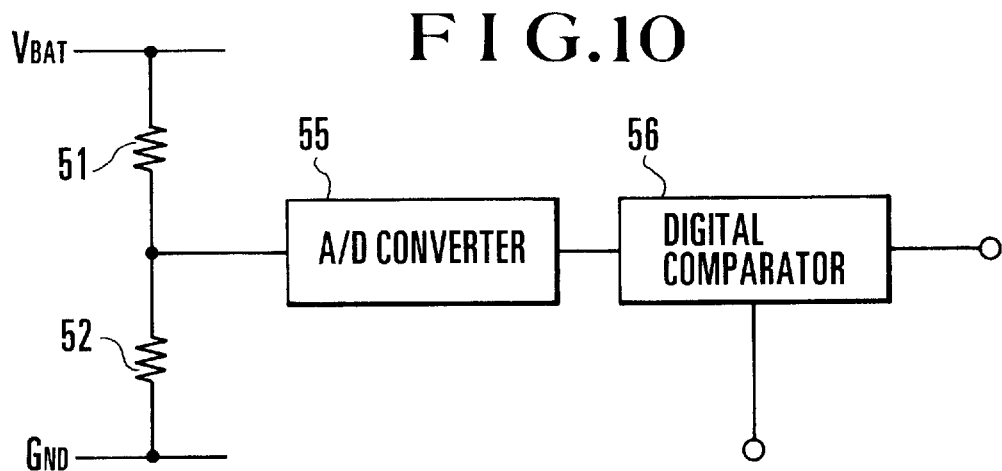
FIG. 10 is a circuit diagram showing another construction of the voltage detecting means.

FIGS. 9 and 10 are circuit diagrams of specific examples of the voltage detecting means 2.

FIG. 9 shows one example of the voltage detecting means 2 which employs a comparator. A comparator 53 compares the value obtained by dividing the voltage $V_{BAT}$ by resistors 51 and 52 with the reference voltage generated by reference voltage generating means 54, thereby detecting the voltage $V_{BAT}$.

FIG. 10 shows another example of the voltage detecting means 2 which employs an A/D converter. An A/D converter 55 performs analog-to-digital conversion of the value obtained by dividing the voltage $V_{BAT}$ by the resistors 51 and 52, and a digital comparator 56 compares the obtained digital value with a predetermined value, thereby detecting the voltage $V_{BAT}$. The digital comparator 56 may be replaced with software processing inside the control means 4.

Although FIGS. 9 and 10 show the specific examples of the voltage detecting means 2, the present invention is not limited to either of the examples. In addition, even if there are a plurality of outputs, it is possible to achieve similar effects.

Figure 11:
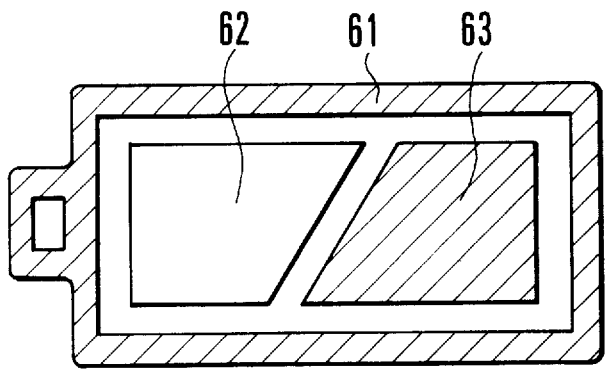
FIG. 11 is a schematic diagram showing one example of the display means used in the embodiment of FIG. 4.

FIG. 11 is a view showing the battery-check display provided by the display means 11.

The battery-check display changes according to the power source voltage in the following manner:

(1) Marks 61, 62 and 63 are on when the power source voltage is high;
(2) The marks 61 and 63 are on and the mark 62 is off when the power source voltage is of medium value;
(3) The mark 61 is on, the mark 62 is off and the mark 63 is blinked when the power source voltage is low; and
(4) The mark 61 is on and the marks 62 and 63 are off when the power source voltage is lower than that in the case (3).

The battery-check display provided in Step #411 of the flowchart of FIG. 8 may also be altered. For example, in the case (3) in which the power source voltage is low, the blinking period of the mark 63 may be altered to vary the off time of the mark 63 with the voltage $V_{BAT}$, as shown in FIG. 12, so that a more definite display can be realized.

Figure 12:
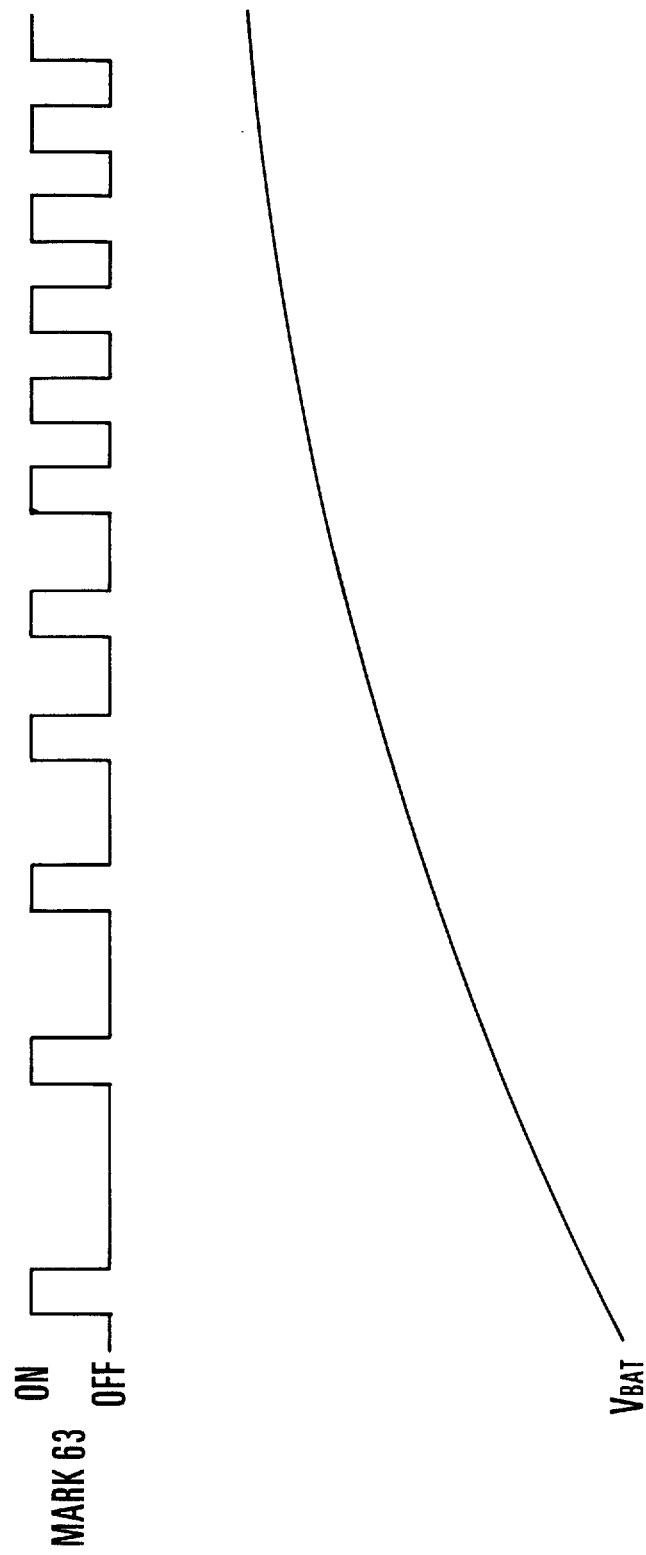
FIG. 12 is an explanatory view showing the embodiment of the display means of FIG. 4.

The form of the battery-check display is not limited to the battery-check display shown in FIG. 11 or 12, and it is also possible to adopt various other numerical-value display, % display or display using a plurality of bars without impairing the effects of the present invention.

The battery-check displays in Steps #411 and #413 of the flowchart of FIG. 8 may be realized by using the same mark or different marks.

Display indicative of the warning of abnormality may be common to the battery-check displays provided in Steps #411 and #413, or different special marks or other warnings, such as sound or vibration, may also be employed.

Figure 13:
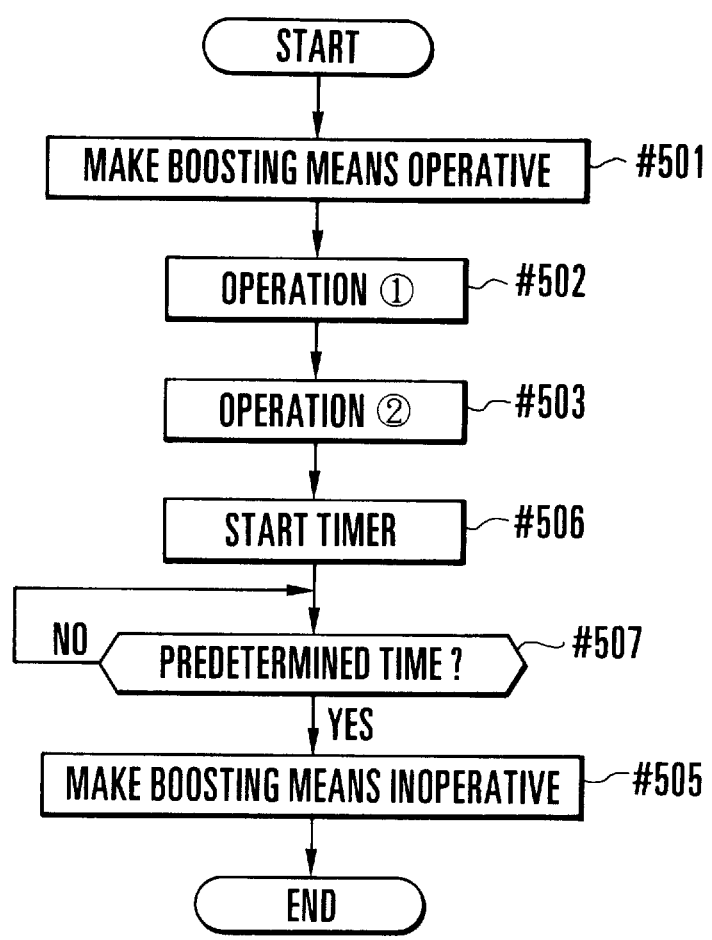
FIG. 13 is a flowchart aiding in explaining the operation of a fifth embodiment of the present invention.

FIG. 13 is a flowchart showing the operation of a fifth embodiment of the present invention. In this flowchart, Steps #501, #502, #503 and #505 are functionally identical to Steps #101, #102, #103 and #105 of the flowchart of FIG. 3, respectively.

In this flowchart, after the heavy-load operation ② is carried out in Step #503, a timer is started (#506). After the passage of a predetermined time (the time required for the battery voltage to be restored to the minimum operating voltage of the microcomputer or a time slightly longer than that time) (#507), the boosting means 3 is made inoperative (#505).

As is apparent from the foregoing description, according to any of the preferred embodiments of the present invention, since the boosting means 3 is made inoperative after the passage of the time required for the voltage $V_{BAT}$ to be restored after the supply of a large-load current, it is possible to suppress occurrence of problems such as operational failure and system reset caused by lowering in the voltage $V_{DD}$.

In addition, by adopting an arrangement capable of setting and altering the length of the predetermined time on the basis of the kind of battery, the circuit construction of the reset means, temperature, the amount of the large-load current supply operation and the like, it is possible to more securely suppress occurrence of the aforesaid problems, and it is also possible to realize power-source control which matches each individual electronic apparatus.

What is claimed is:

1. An electronic apparatus comprising:
   (a) a power source;
   (b) a boosting circuit which boosts an output of said power source;
   (c) a control circuit arranged to be supplied with electrical power from said boosting circuit and said power source, said control circuit performing operation control of said electronic apparatus;
   (d) a voltage detecting circuit which detects an output voltage of said power source means; and
   (e) a control part for shifting the boosting circuit from an operative state to an inoperative state at the time either of one of a predetermined control operation by the control circuit or a time required to finish the predetermined control operation by the control circuit, or the time after the predetermined control operation by the control circuit, said control part inhibiting said boosting circuit from changing from the operative state to the inoperative state when the output voltage of said power source detected by said voltage detecting circuit is lower than a predetermined voltage during either the time of the one of the predetermined control operation or the time required to finish the operation by the control circuit or the time after the predetermined control operation by the control circuit.

2. An electronic apparatus according to claim 1, wherein said control part causes said boosting circuit to change to the inoperative state upon completion of the predetermined control operation if the output voltage of said power source means detected by said voltage detecting circuit is higher than the predetermined voltage.

3. An electronic apparatus according to claim 1, wherein said control circuit includes a microcomputer and said microcomputer is supplied with electrical power from said boosting circuit or said power source and causes said control circuit to perform operation control of a load circuit, said control part causing said boosting circuit to change to the inoperative state upon completion of a predetermined control operation of said computer if the output voltage of said power source detected by said voltage detecting circuit is higher than the predetermined voltage or if the output voltage is restored to a state higher than the predetermined voltage.

4. An electronic apparatus according to claim 3, further comprising setting means for setting the predetermined voltage to a voltage equal to or slightly higher than a minimum operating voltage of said computer according to the minimum operating voltage.

5. An electronic apparatus according to claim 3, further comprising setting means for setting a value of the predetermined voltage according to an ambient environmental condition and/or an operating mode of said computer.

6. An electronic apparatus according to claim 5, wherein the ambient environmental condition is a temperature condition and the operating mode of said computer is a high- or low-speed driving mode, said setting means setting the predetermined voltage to a lower voltage for a higher temperature or during the low-speed driving mode.

7. An electronic apparatus according to claim 3, further comprising: time counting means for counting a time period from the completion of the predetermined control operation of said computer until the output voltage is restored to the state higher than the predetermined voltage; and determining means for determining a state of consumption of said power source means on the basis of the time period counted by said time counting means.

8. An electronic apparatus according to claim 3, further comprising: time counting means for counting a time period from the completion of the predetermined control operation of said computer until the output voltage is restored to the state higher than the predetermined voltage; and determining means for determining that an abnormality has occurred, if the time period counted by said time counting means exceeds a predetermined time period.

9. An electronic apparatus according to claim 8, further comprising indicating means for indicating the abnormality if said determining means determines that the abnormality has occurred.

10. An electronic apparatus according to claim 8, further comprising storage means for storing a state of said electronic apparatus if said determining means determines that the abnormality has occurred.

11. An electronic apparatus according to claim 3, further comprising reset means for resetting said computer to an initial state if a voltage to be supplied to said computer falls below a predetermined reset voltage lower than the predetermined voltage.

12. An electronic apparatus according to claim 1, wherein said control circuit serves also as said control part.

13. An electronic apparatus according to claim 3, wherein said control circuit serves also as said control part.

14. An electronic apparatus according to claim 13, further comprising setting means for setting the predetermined voltage to a voltage equal to or slightly higher than a minimum operating voltage of said computer according to the minimum operating voltage.

15. An electronic apparatus according to claim 13, further comprising setting means for setting a value of the predetermined voltage according to an ambient environmental condition and/or an operating mode of said computer.

16. An electronic apparatus according to claim 15, wherein the ambient environmental condition is a temperature condition and the operating mode of said computer is a high- or low-speed driving mode, said setting means setting the predetermined voltage to a lower voltage for a higher temperature or during the low-speed driving mode.

17. An electronic apparatus according to claim 13, further comprising: time counting means for counting a time period from the completion of the predetermined control operation of said computer until the output voltage is restored to the state higher than the predetermined voltage; and determining means for determining a state of consumption of said power source means on the basis of the time period counted by said time counting means.

18. An electronic apparatus according to claim 13, further comprising: time counting means for counting a time period from the completion of the predetermined control operation of said computer until the output voltage is restored to the state higher than the predetermined voltage; and determining means for determining that an abnormality has occurred, if the time period counted by said time counting means exceeds a predetermined time period.

19. An electronic apparatus according to claim 18, further comprising storage means for storing a state of said electronic apparatus if said determining means determines that the abnormality has occurred.

20. An electronic apparatus comprising:
(a) a power source;
(b) a boosting circuit which boosts an output of said power source;
(c) a control circuit including a computer which is arranged to be supplied with electrical power from said boosting circuit and said power source, said control circuit performing operation control of a load circuit; and
(d) a control part which causes said boosting circuit to change from an operative state to an inoperative state after a predetermined time passes after completion of operation control processing by said control circuit, said predetermined time being set to correspond to the time required for a power source battery to restore to a predetermined level.

21. An electronic apparatus according to claim 20, further comprising time counting means for counting the predetermined time, the predetermined time being set according to one of the kind of said power source, an operation mode of said computer, ambient temperature and a reset voltage for resetting said computer to an initial state.

22. An electronic apparatus according to claim 20, wherein said control circuit serves also as said control part.

23. An electronic apparatus comprising:
(a) a power source;
(b) a boosting circuit which boosts an output of said power source;

(c) a control circuit arranged to be supplied with electrical power from said power source and said boosting circuit, said control circuit performing operation control of said electronic apparatus;

(d) a voltage detecting circuit for detecting an output voltage of said power source; and (e) a determining circuit which determines, after completion of a predetermined operation control by said control circuit, a state of consumption of said power source wherein said determining circuit determines the state of consumption on the basis of time required by the output voltage of said power source detected by said detecting circuit to restore to a predetermined voltage level after completion of the predetermined operation control.

24. An electronic apparatus according to claim 23, further comprising storage means for storing a state of said electronic apparatus if said determining circuit determines that an abnormality has occurred.

* * * * *

UNITED STATES PATENT AND TRADEMARK OFFICE
CERTIFICATE OF CORRECTION

PATENT NO. : 5,809,315
DATED : September 15, 1998
INVENTOR(S) : Masanori Ohtsuka It is certified that error appears in the above-identified patent and that said Letters Patent is hereby corrected as shown below:

Col. 5, line 56, after "voltage ①" insert --)--.

Col. 7, line 39, after "voltage ②" insert --)--.

Signed and Sealed this

Ninth Day of February, 1999

Attest:

*Attesting Officer*

*Acting Commissioner of Patents and Trademarks*